Patented Sept. 24, 1935

2,015,385

UNITED STATES PATENT OFFICE 2,015,385

COMPOSITION OF MATTER

Ernest W. Reid, Pittsburgh, Pa., assignor to Carbide and Carbon Chemicals Corporation, a corporation of New York No Drawing. Application September 23, 1931, Serial No. 564,707

3 Claims. (Cl. 106—40)

The invention relates to compositions containing cellulose acetate, and includes new solvents for forming such compositions. The new solvents disclosed by my invention contain mixtures of bis beta chloroethyl ether $$(CH_2Cl.CH_2.O.CH_2.CH_2Cl)$$

with aliphatic alcohols.

Attempts have been made to use various chlorinated compounds as solvents for cellulose acetate, but aging tests show that cellulose acetate compositions containing the chlorinated solvents previously suggested to the art, for example carbon tetrachloride, undergo a gradual and steady deterioration upon standing.

Compositions prepared with cellulose acetate and solvents containing mixtures of bis beta chloroethyl ether and aliphatic alcohols are useful in preparing dopes, lacquers and the like which aging tests have shown to be unchanged after long periods of time. The advantages of new solvent mixtures from which satisfactory cellulose acetate compositions may be prepared will be immediately apparent.

Bis beta chloroethyl ether and a majority of the aliphatic alcohols individually are non-solvents for cellulose acetate, but mixtures containing the chlorinated ether together with small amounts of an alcohol, such as ethyl alcohol, are excellent solvents for cellulose acetate. Bis beta chloroethyl ether has a boiling point of about 178° C., and a specific gravity of 1.22 at 20°/20° C. The alcohols which may be advantageously used therewith are those having no more than six carbon atoms in their structure and are typified by the aliphatic alcohols, such as methyl, ethyl, isopropyl, and n-butyl alcohols; the alkoxy alcohols, such as $\beta$ methoxy or $\beta$ ethoxy ethyl alcohol; and the alkoxy ether alcohols, such as $\beta$ methoxy or $\beta$ ethoxy $\beta'$ hydroxy diethyl ether. Of these alcohols I prefer to use methyl or ethyl alcohol, B ethoxy ethyl alcohol or $\beta$ ethoxy $\beta'$ hydroxy diethyl ether. The solvent properties of mixtures of bis beta chloroethyl ether with the higher alcohols are not as great as those of mixtures compounds of the ether and the lower alcohols, but certain of the higher alcohols are useful in these solvent mixtures because of their lower vapor pressures and evaporation rates.

As an illustration of a few of the many suitable solvent mixtures contemplated by my invention, the following may be cited, the parts being by volume:

| | Parts |
|---|---|
| Bis beta chloroethyl ether | 70 |
| Ethyl alcohol | 30 |

| | Parts |
|---|---|
| Bis beta chloroethyl ether | 70 |
| $\beta$ ethoxy ethyl alcohol | 30 |

| | Parts |
|---|---|
| Bis beta chloroethyl ether | 70 |
| $\beta$ ethoxy $\beta'$ hydroxy diethyl ether | 30 |

The proportion of the dichloro ether is usually greater than that of the alcohol for best results, and preferably the alcohol used therewith should have a rate of evaporation similar to that of the ether. It will be recognized by those conversant with the art that the mixtures made available by my invention provide a range of solvents suitable for many applications. These solvent mixtures may be extended or diluted with various non-solvents or diluents as desired. Various diluents may be used, and toluene, xylene and benzene are examples of those which may be employed with my new solvents.

I claim:

1. Composition of matter containing cellulose acetate dissolved in a solvent consisting of a mixture of bis-beta-chloroethyl ether and $\beta$ ethoxy ethyl alcohol.

2. Composition of matter containing cellulose acetate dissolved in a solvent consisting of a mixture of bis-beta-chloroethyl ether and $\beta$ ethoxy $\beta'$ hydroxy diethyl ether.

3. Composition of matter containing cellulose acetate dissolved in a solvent consisting of a mixture of bis-beta-chloroethyl ether and one of the group consisting of $\beta$ ethoxy ethyl alcohol and $\beta$ ethoxy $\beta'$ hydroxy diethyl ether.

E. W. REID.

CERTIFICATE OF CORRECTION.

Patent No. 2,015,385. September 24, 1935.

ERNEST W. REID.

It is hereby certified that error appears in the printed specification of the above numbered patent requiring correction as follows: First column, line 46, for "compounds" read composed; and that the said Letters Patent should be read with this correction therein that the same may conform to the record of the case in the Patent Office.

Signed and sealed this 12th day of November, A. D. 1935.

Leslie Frazer
Acting Commissioner of Patents.

(Seal)